United States Patent [19]

Carlson

[11] Patent Number: 4,780,215

[45] Date of Patent: Oct. 25, 1988

[54] WATER PURIFICATION DEVICE

[76] Inventor: Russell L. Carlson, 68 Minwood Dr., Tallmadge, Ohio 44278

[21] Appl. No.: 59,531

[22] Filed: Jun. 8, 1987

[51] Int. Cl.⁴ ............................................. C02F 1/78
[52] U.S. Cl. .................... 210/722; 210/747; 210/760
[58] Field of Search ............ 210/721, 722, 747, 760, 210/170, 748

[56] References Cited

U.S. PATENT DOCUMENTS 4,172,786 10/1979 Humphrey et al. ............ 210/760 X
4,361,486 11/1982 Hou et al. ...................... 210/759 X
4,412,924 11/1983 Feather ........................... 210/760 X Primary Examiner—Tom Wyse
Attorney, Agent, or Firm—Oldham & Oldham Co.

[57] ABSTRACT

A process for purifying well water is described involving the injection of an ozone enriched stream of air, generated by passing air through an electric arc, beneath the surface of the water under conditions suitable for oxidizing soluble iron and sulfur compounds present in the water to an insoluble state. Solids thereby formed are subsequently removed by filtration. The treatment process may either be performed within the well itself, or the well water may be removed and then treated.

5 Claims, 2 Drawing Sheets

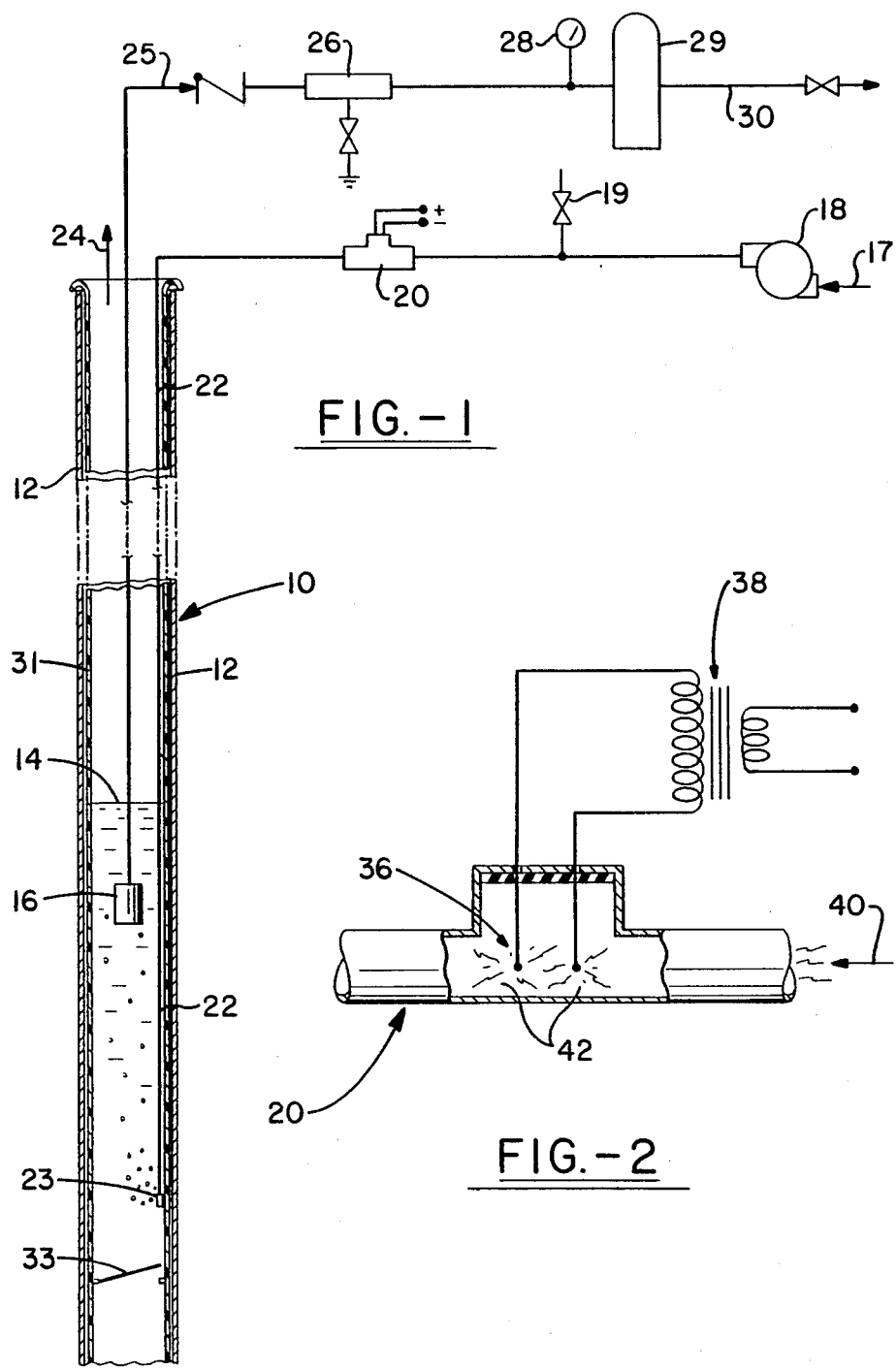

WATER PURIFICATION DEVICE

This invention relates to water purification. More particularly, this invention relates to an improved process for removing soluble iron and sulfur compounds from water. Specifically, this invention relates to a process for oxidizing soluble iron and sulfur compounds in well water to insoluble compounds by treatment of the water with ozone enriched air, and subsequently removing the resulting insoluble reaction products by filtration.

BACKGROUND ART

As water percolates through the aquifers containing it, it dissolves certain sulfur and iron compounds from the mineral deposits through which it passes. This contamination is the cause of the frequent tendency of well water to have a peculiar taste; to smell like rotten eggs; to produce iron stains on materials with which it comes in contact, or often, to display a combination of such characteristics.

The problem of mineral contamination is one of long standing, and various solutions have been proposed for eliminating it. For example, soluble ferrous iron is sometimes oxidized by treatment with various chlorinated reagents to produce filterable hydrated ferric compounds. In larger treatment systems, resort is often had to sodalime softening processes, or aeration of the water, with the resulting precipitants being removed by filtration. In addition, catalytic manganese oxides have also been used to oxidize ferrous iron present in water to insoluble hydrated ferric compounds. In addition, domestic water systems relying on well water commonly use cation exchange resin beds for iron removal. In the case of sulfur compounds such as hydrogen sulfide, adsorbents, as for instance activated carbon and the like, are sometimes employed for removal purposes.

All the treatment methods described are capable of removing iron and sulfur contaminents; however, all have drawbacks of one type or another. Cation exchange resins, for example, are not particularly efficient in removing iron, and the desorbing of the iron in the regeneration step not only requires contact with sodium chloride, but also treatment with a reactant such as sodium hydrosulfite, a citrate, or similar materials. A manganese catalyst involves regenerative treatment with permanganate salts, an expedient which is not only costly, but impractical for most domestic systems. Aeration processes for the most part necessitate large, inefficient equipment, restricting their usefulness to the larger municipal and industrial water treatment systems. Furthermore, not all such systems destroy harmful bacteria and other organisms present in the water.

DISCLOSURE OF THE INVENTION

In light of the foregoing, therefore, it is a first aspect of the herein disclosed invention to provide a method of treating well water that is practical for small, domestic users;

a second aspect of the invention is to provide a method by which iron and sulfur compounds can be removed inexpensively, with minimal equipment;

another aspect of the invention is the provision of a water purification system which accomplishes removal of iron and sulfur compounds without any need for special catalysts or ion exchange resins;

a further aspect of the invention described is to supply a highly efficient oxidizing system for eliminating contained soluble iron and sulfur impurities from well water;

an additional aspect is to furnish a water purification system which employs a readily available, inexpensive oxidizing agent for the operative reaction;

still another aspect of the invention is the destruction of harmful bacteria and other organisms in well water;

these and other aspects are provided by a process for purifying well water comprising forming ozone enriched air by passing a stream of air through an electric arc, subsequently passing the enriched stream beneath the surface of the well water to be purified, and thereafter separating the resulting solids from said well water by filtration;

yet other aspects are provided by a process for removing soluble iron and sulfur compounds from well water comprising oxidizing said compounds to a substantially water insoluble state by contacting said compounds with ozone enriched air until said compounds are oxidized to said substantially insoluble state, and thereafter removing the insoluble compounds from said well water by filtration;

the preceding and other aspects are further provided by a process for substantially removing soluble iron and sulfur compounds from well water comprising forming ozone enriched air by passing a stream of air through an electric arc, thereafter passing the ozone enriched stream beneath the surface of water contained in a water well during a treatment period sufficient to oxidize said compounds to a substantially insoluble state, and thereafter separating the resulting insoluble compounds from the treated water by removing the treated water from the water well and passing it through a filter.

BRIEF DESCRIPTION OF THE DRAWINGS

The invention will be better understood when reference is had to the included drawings in which:

FIG. 1 is a schematic diagram of a well provided with the ozone injection system of the invention;

FIG. 2 is a schematic diagram of an ozone generator useful for purposes of the invention.

BEST MODE FOR CARRYING OUT THE INVENTION

Figure 3:
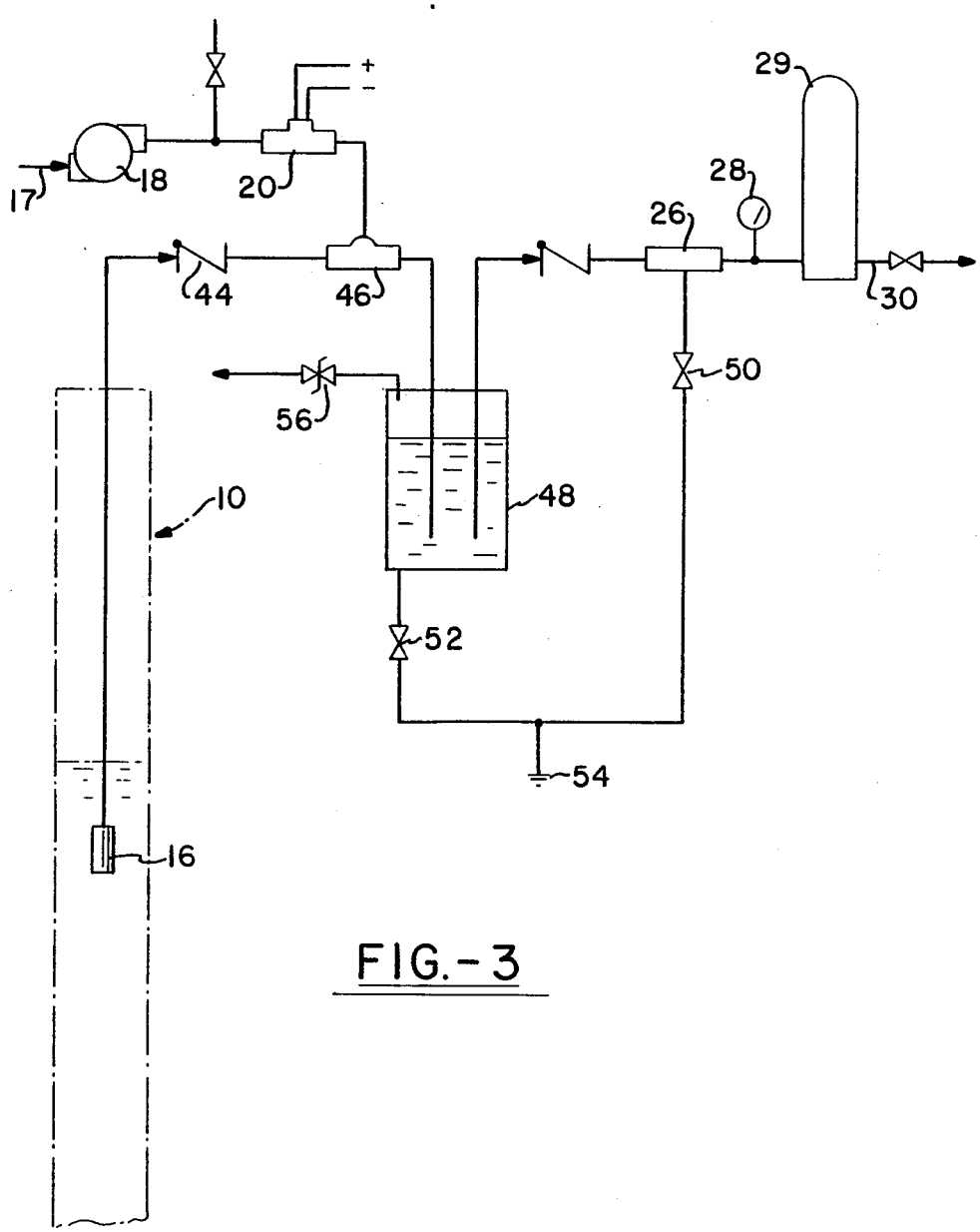
FIG. 3 shows a schematic drawing of an alternative ozone treatment embodiment.

While the invention described hereinafter is not to be construed as limited to one of the particular piping systems described, FIG. 1 is a schematic diagram of the treatment system showing a well, indicated generally by the numeral 10, including a well casing 12 containing well water 14, and a submersible pump 16. In the course of the treatment process, air is drawn into air inlet 17 by air compressor 18. The inducted air is directed in an amount controlled by bleed valve 19 to an ozone generator 20, in which some of the oxygen in the air is converted to ozone in an electric arc. The ozone enriched air stream is thereafter passed through air line 22 to sparge point 23, located beneath the surface of the well water. The ozone containing air stream discharges into the well water in the form of fine bubbles which rise up through the water, allowing the contained ozone to be dissolved therein the process. Undissolved air eventually exits the well at air outlet 24. Treated well water is forced by submersible pump 16 up through water line 25 to particle filter 26 where the precipitated iron and sulfur containing particles are removed. From particle filter 26, the treated water flows into pressure tank 29 until the system reaches its working pressure, determined by the setting of pressure control switch 28. Thereafter, the treated water enters service line 30, as required to supply the water needs of the system in connection with which the well and its associated equipment are employed.

Although the nature of the chemical reaction will vary, depending upon the types of iron and sulfur contaminants present in the water, the process is basically designed to oxidize soluble, ferrous iron compounds to insoluble, ferric compounds. For example, soluble ferrous bicarbonate, $Fe(HCO_3)_2$, is oxidized to insoluble ferric hydroxide, $Fe(OH)_3$. Sulfur present commonly appears as hydrogen sulfide, $H_2S$, which is oxidized to elemental insoluble sulfur, S. The ozone also acts as an efficient biocide, destroying harmful bacteria and other undesirable organisms present in the water.

The oxidizing agent, $O_3$, contained in the ozone enriched stream of air emanating from ozone generator 20, is injected below the surface of the well water 14 at a rate low enough to avoid cavitation of submersible pump 16 due to the intake of water containing excessive amounts of air bubbles, but at rates high enough so that sufficient ozone is present to produce the desired reaction. The proper rate of air injection will depend upon such things as the type of pump employed, the diameter of the well casing 12, the diameter of the air inlet tube 22, and similar considerations. While the correct injection rate will be easily determined by experience with a particular system, in a well system employing a casing of from about 4 to 6 inches, and an air line of about $\frac{1}{4}$ to $\frac{3}{8}$ inch, it will be found that an air injection rate of about 0.2 to 0.5 cubic feet per minute produces satisfactory results. Although any of various submerged locations may be selected, it has been determined that the sparge point 23 of the air line 22 should be located below submersible pump 16, or other water intake point, to produce particularly desirable reactions between the ozone and the well water contaminants. Sparge point 23 may simply consist of open tubing, or a gas diffuser such as a carbate diffuser may be attached to the end of the tubing to produce line bubbles, particularly adapted to facilitating reaction between the ozone contained therein and the dissolved contaminants, and to avoid cavitation problems. In those instances where a diffuser is not employed, it has been found useful to attach a length of metal piping to the end of the air line to assist its deployment and positioning in the well. Although FIG. 1 shows a submersible pump 16, other types of pumps, for example, "jet" pumps, located within or without the well, may also be used. Pumps located externally of the well such as jet pumps are particularly preferred, however, since the external parts thereof are not in contact with the well water, and therefore, are less vulnerable to corrosion.

The treated water removed from the well through water line 25 contains fine particles produced by the oxidation reaction. These may be removed by particle filter 26, prior to entering pressure tank 29, or they may be removed after leaving the tank. It is preferable to remove the particles prior to the tank, however, in order to avoid the possibility of an accumulation of sediments at the bottom thereof. While various filters may be used, it has been found particularly desirable to use cartridge filters, especially those of the type using cellulose as the filter medium.

The device of the invention is useful both in the case of wells provided with a casing, such as steel pipe, as well as in situations where no casing is employed. However, in those instances where a well casing is present, it has sometimes been found desirable to minimize any extraneous reaction of ozone with the well casing by protecting the well with a protective sleeve 31. Where such a sleeve is used, its diameter will be selected to be at least about, preferably slightly greater than the internal diameter of the casing. A check valve assembly 33, for example a flapper valve, is attached to the lower end of the sleeve 31, and the sleeve is lowered into the well as shown in FIG. 1. Thereafter, the sleeve is filled with water in order to expand the sleeve to its deployed position adjacent to the inside wall of the casing 12. During this operation, check valve 33 prevents water from leaving the lower, open end of the sleeve 31. Casing sleeve 31 may be formed from any suitable barrier film such as, for instance, a polyester, polyvinylchloride, similar ozone resistant material. A film thickness of 4 to 10 mils has been found to satisfactorily protect the casing, although other thicknesses can be used. While the insertion of a casing sleeve 31 as described provides good corrosion protection, particularly where the water purification device of the invention is to be introduced into an existing well system, corrosion protection can also be provided by employing a casing whose interior has been coated with a suitable barrier film. After being filled as described, the well is in condition for connection with a jet pump (not shown), or insertion of submersible pump 16, together with air line 22, and other desired equipment. Well casing thus protected substantially avoids unwanted, corrosion producing, extraneous reaction of ozone with the metal casing 12. When the well is put into service, the level of water in the sleeve 31 drops to that capable of being maintained by pressure in the water-bearing aquifer, at which point the check valve 33 allows water to enter the well unimpeded, maintaining the working level of the well.

FIG. 2 shows a schematic diagram of an ozone generator, shown generally by 20, useful for purposes of the invention. In the Figure, there is provided an electric arc generator, illustrated generally by the numeral 36. The ozone generator comprises an enclosed structure equipped with an arc generator 36 which may consist of electrodes capable of generating an arc therebetween, or between the electrodes and the grounded wall of the enclosed structure. The desired arcing is produced by applying a voltage from, for instance, the high voltage transformer shown generally by 38, while simultaneously directing a flow of air 40 through the enclosed structure, exposing the oxygen in the air to the arcing 42, thereby producing an enriched ozone stream.

FIG. 3 is a schematic drawing of an alternative ozone treatment technique in which water from a water well, indicated generally by 10, is forced by submersible pump 16 past a check valve 44, through a flow mixer 46, which can be a jet pump. Also introduced into flow mixer 46 is an ozone rich air stream produced by passing air from inlet 17 through compressor 18 and ozone generator 20 into the flow mixer. The well water and ozone entering the flow mixer 46 are thoroughly mixed before being introduced into treatment tank 48, where the mixture is provided with a sufficient contact time to assure substantial completion of the reaction between the ozone and the well water contaminants, as well as a dequate agglomeration of reaction products to assure proper filtration. Such time will depend upon the prevailing treatment conditions, and is readily determined in a particular situation. The treated water is thereafter removed from treatment tank 48 and directed through particle filter 26 where the insoluble particles resulting from the ozone treatment are removed. Following removal of the insoluble particles, the purified water enters pressure tank 29 where it is available to water service line 30. Periodically, as required, particle filter 26 is subjected to a backwash from pressure tank 29 which flushes the insoluble particles past valve 50 to sewer 54. Likewise, sediments of insoluble particles accumulating in treatment tank 48 can be periodically removed through valve 52 to sewer 54. Backwash of particle filter 26, as shown in the embodiment illustrated by FIG. 1 is accomplished in similar fashion. The flow mixer 46 may be selected from any of the devices for mixing gases and liquids known to those skilled in the art, for example, static mixtures, injector mixtures, and the like. Treatment tank 48 can be any tank capable of withstanding the working pressure of the system which is able to resist corrosion, for instance, bylining with glass, epoxy, or equivalent material. The tank is also equipped with a pressure retaining vent mechanism such as valve 56 which allows excess air and ozone to be vented from the system. While the flow mixer 46 provides intimate mixing of the ozone enriched stream with the untreated well water, leading to a rapid reaction of the unwanted contaminants with the ozone, if desired, the ozone enriched stream can be introduced directly into treatment tank 48. Also, if the reaction particles are sufficiently agglomerated, the treated well water may be filtered directly, following its mixing with the ozone enriched stream in flow mixer 46. The treatment method selected will depend upon considerations such as the amount of contaminants present in the water to be treated, the concentration of ozone in the enriched stream of air, the intimacy of the mixing, and similar consideration. Under normal circumstances, however, it will be found desirable to provide for a treatment period of from about 1 to 3 minutes following mixing, before the treated mixture is filtered.

The concentration of ozone in the well required for proper treatment will depend upon such things as the amount of contaminants, e.g., iron and/or sulfur compounds in the well, the residence time of the water in the well, and similar factors. However, it has been found that a concentration of at least about 0.1 parts per million, on a weight basis, of ozone should be present during the treatment process, with a concentration of from about 0.1 to 1 part per million, on a weight basis, being prefered. Although other systems can be used, it has also been found convenient to introduce the ozone rich air stream simultaneously with withdrawal of water from the well. This may be accomplished, for instance, by arranging the wiring of the pressure control switch 28 so that when the switch is activated, the compressor 18 and ozone generator 20 are likewise activated. Thus as submersible pump 16 is withdrawing water from the well, allowing fresh untreated water to enter, ozone rich air is entering at sparge point 23. If experience shows that introduction of the enriched stream during the pumping period is insufficient to produce the desired concentration, the treatment period can be prolonged, as required. While any of various arc producing generators known in the art may be adapted for purposes of the invention, the application of a voltage of from about 5,000 to 17,000, commonly around 10,000 volts, to suitably placed electrodes will produce satisfactory arcing. One form of arc generator, for example, can simply be a spark plug positioned in the vertical structure of a piping "tee", so as to extend into the horizontal section of the tee through which air is passed to produce the desired ozone.

While in accordance with the patent statutes, a preferred embodiment and best mode has been presented, the scope of the invention is not limited thereto, but rather is measured by the scope of the attached claims.

What is claimed is:

1. A process for substantially removing soluble iron and sulfur compounds from well water comprising forming ozone enriched air by passing a stream of air through an electric arc, thereafter passing the ozone enriched stream beneath the surface of water contained in a water well during a treatment period sufficient to oxidize said compounds to a substantially insoluble state, and thereafter separating the resulting insoluble compounds from the treated water by removing the treated water from the water well and passing it through a filter.

2. The process of claim 1 in which the concentration of ozone in the water is maintained in the range of from about 0.1 to 1 part per million, on a weight basis, during a treatment period.

3. The process of claim 1 in which the filter used to remove the insoluble compounds employs cellulose as the filter medium.

4. The process of claim 1 in which the water well is lined with a metal casing, the interior of which is protected by a plastic sleeve or film.

5. The process of claim 1 in which the ozone-enriched air is passed beneath the surface of said well water through an air line which includes a length of metal pipe.

* * * * *